(12) United States Patent
Matori

(10) Patent No.: US 12,233,802 B2
(45) Date of Patent: Feb. 25, 2025

(54) VEHICLE BODY STRUCTURE FITTED WITH ENVIRONMENT SENSOR

(71) Applicant: HONDA MOTOR CO., LTD., Tokyo (JP)

(72) Inventor: Tadahiro Matori, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 315 days.

(21) Appl. No.: 17/955,745

(22) Filed: Sep. 29, 2022

(65) Prior Publication Data

US 2023/0110608 A1   Apr. 13, 2023

(30) Foreign Application Priority Data

Oct. 11, 2021   (JP) .................. 2021-166927

(51) Int. Cl.
*B60R 19/18*   (2006.01)
*B60R 19/48*   (2006.01)
*G01S 13/931*   (2020.01)

(52) U.S. Cl.
CPC ............ *B60R 19/483* (2013.01); *B60R 19/18* (2013.01); *B60R 2019/1886* (2013.01); *G01S 2013/93275* (2020.01)

(58) Field of Classification Search
CPC .......... B60R 19/483; B60R 19/18; B60R 2019/1886; G01S 2013/93275
See application file for complete search history.

(56) References Cited

U.S. PATENT DOCUMENTS

| | | | |
|---|---|---|---|
| 2014/0070982 A1* | 3/2014 | Inada | B60R 19/483 342/385 |
| 2015/0318608 A1* | 11/2015 | Tran | H01Q 1/1207 343/872 |
| 2016/0192518 A1 | 6/2016 | Watanabe | |
| 2016/0207482 A1 | 7/2016 | Tachibana et al. | |
| 2020/0101916 A1* | 4/2020 | Furumoto | B60R 19/30 |
| 2023/0096952 A1* | 3/2023 | Yamamoto | B60R 19/18 293/133 |

FOREIGN PATENT DOCUMENTS

| | | | |
|---|---|---|---|
| DE | 202011052507 U1 * | 5/2013 | ............ B60J 5/0468 |
| JP | H1044891 A | 2/1998 | |
| JP | 2007106199 A | 4/2007 | |
| JP | 2012225733 A | 11/2012 | |
| JP | 2015067083 A | 4/2015 | |
| JP | 2016121927 A | 7/2016 | |
| JP | 2020051926 A | 4/2020 | |

OTHER PUBLICATIONS

Notice of Reasons for Refusal for Japanese Patent Application JP 2021-166927 dated Feb. 14, 2023; 11 pp.

* cited by examiner

*Primary Examiner* — Daniel J Colilla

(74) *Attorney, Agent, or Firm* — Armstrong Teasdale LLP

(57) ABSTRACT

A vehicle body structure includes an environment sensor (22) positioned in an inner space defined between a bumper face and an internal structural member, and attached to the internal structural member, and a cover member (23) including a lower wall (24) extending from the internal structural member to a point adjacent to the bumper face to substantially close the inner space from below. The cover member including a main part (28) forming a base end part thereof and a tip end part (29) extending from the main part to the point adjacent to the bumper face and having a substantially lower stiffness than the main part.

6 Claims, 13 Drawing Sheets

VEHICLE BODY STRUCTURE FITTED WITH ENVIRONMENT SENSOR

TECHNICAL FIELD

The present invention relates to a vehicle body structure fitted with an environment sensor that detects an object located around the vehicle.

BACKGROUND ART

Environmental sensors, such as radars and lidars, are conventionally known as sensors for detecting objects in the surrounding environment. A radar device is often mounted on a front part, a rear part or a corner part of a vehicle to detect other vehicles and other objects that are located ahead of, behind, obliquely forward or obliquely rearward of the own vehicle. Such sensors are desired to be protected from damages and contaminations from elements and external objects.

JP2007-106199A discloses a radar device which is positioned inward of a front bumper (a bumper face) defining a part of the exterior contour of the vehicle, and is supported by a vehicle body structure (front member) via a stay. The microwave radiation emitted from the radar device is transmitted through the front bumper, and the reflected microwave radiation is transmitted back through the front bumper. Since the radar device is placed inward of the front bumper, the radar device is prevented from contamination and external impacts so that the durability of the radar device is improved.

According to this conventional arrangement, although the radar device is placed inside the bumper face, rainwater, mud, dust and other foreign matters that are splashed up from the road surface may enter the interior of the bumper face, and get deposited on the radar device.

This problem could be alleviated by providing a cover member that extends between the bumper face and the vehicle body to prevent foreign matters from reaching the radar device. However, when an impact load is applied to the bumper face from the outside, the impact load may be transmitted to the radar device and/or the stay supporting the radar device via the cover member with the result that the radar device may be damaged or the aiming direction of the radar device may be shifted or otherwise displaced from the original setting.

To overcome this problem, it is conceivable to use a cover member made of highly flexible resin material so that the cover member can be readily deformed when an impact load is applied to the bumper face, and the load transmitted to the radar device may be minimized. However, the cover member may be too flexible to withstand the pressure applied by splashed water and other objects thrown up from the road surface so that an adequate protection may not be obtained.

SUMMARY OF THE INVENTION

In view of such a problem of the prior art, a primary object of the present invention is to provide a vehicle body structure fitted with an environment sensor that can protect the environment sensor from contamination and external loading at the same time.

To achieve such an object, the present invention provides a vehicle body structure fitted with an environment sensor (22), comprising: a bumper face (6) provided on an exterior of a vehicle body (2); an internal structural member (12) positioned inward of the bumper face (6) so as to define an inner space between the bumper face and the internal structural member; an environment sensor (22) positioned in the inner space and attached to the internal structural member; and a cover member (23) including a lower wall (24) extending from the internal structural member to a point adjacent to the bumper face to substantially close the inner space from below, the cover member including a main part (28) forming a base end part thereof and a tip end part (29) extending from the main to the point adjacent to the bumper face and having a substantially lower stiffness than the main part.

Since the inner space in which the environment sensor is positioned is separated from the surrounding space by the cover member, contamination such as moisture, mud and so on is prevented from reaching the radar device. The main part of the cover member ensures an adequate resistance to external impacts. When an impact is applied to the bumper face, the flexible tip end part prevents the impact to be transmitted to the main part of the cover member so that the main part of the cover member is protected from external impact and the environment sensor is prevented from being affected by the external impact. The bumper face may be either a front bumper face or a rear bumper face.

Preferably, the main part and the tip end part are made of a plate member of a same material, and the main part is given with an increased bending stiffness by a reinforcing feature formed therein as compared with the tip end part.

Since the main part and the tip end part of the cover member are made of the same material, manufacturing of the cover member can be simplified.

Preferably, the reinforcing feature includes a rib (33) provided in the main part and extending in a longitudinal direction.

Thereby, the bending stiffness of the main part can be effectively increased.

Preferably, the reinforcing feature includes a flange (32) extending laterally on the main part.

The lateral flange can be easily formed on the main part, and is effective in increasing the bending stiffness of the main part.

Preferably, the flange includes a first part extending laterally along a base end part of the lower wall, and a second part extending laterally at some distance from the base end of the lower wall.

Thereby, the flange can effectively reinforce the main part of the lower wall. The main part in this case may be delimited by the flange.

Preferably, the reinforcing feature includes a ridge (42) extending laterally on the lower wall.

Since the main part and the tip end part can be formed on the same plane, the manufacture of the cover member can be simplified. The ridge may be formed by bending the material of the lower wall, and may have a V shaped, a U shaped or a channel shape.

Preferably, the main part and the tip end part are made of a plate member of a same material, and the tip end part has a smaller thickness than the main part.

Thereby, the stiffness of the main part and the stiffness of the tip end part can be easily differentiated by difference in thickness.

Preferably, the main part is made of a first material, and the tip end part is made of a second material having a substantially lower modulus of elasticity than the first material.

Thereby, the stiffness of the main body and the stiffness of the tip end part can be freely selected by using different materials.

Preferably, the bumper face is provided with a recessed part (R) which receives a tip end of the lower wall. The recessed part is effective in preventing foreign matters splashed from the road surface from reaching above the lower wall.

Since the tip end of the lower wall is effectively shielded by a part of the bumper face immediately under the recess from foreign matters thrown up from the road surface, the cover member is able to protect the environment sensor in a favorable manner.

The present invention thus provides a vehicle body structure fitted with an environment sensor that can protect the environment sensor from contamination and external loading at the same time.

DETAILED DESCRIPTION OF THE PREFERRED EMBODIMENT(S)

Various embodiments of the present invention will be described in the following with reference to the appended drawings.

First Embodiment

Figure 1:
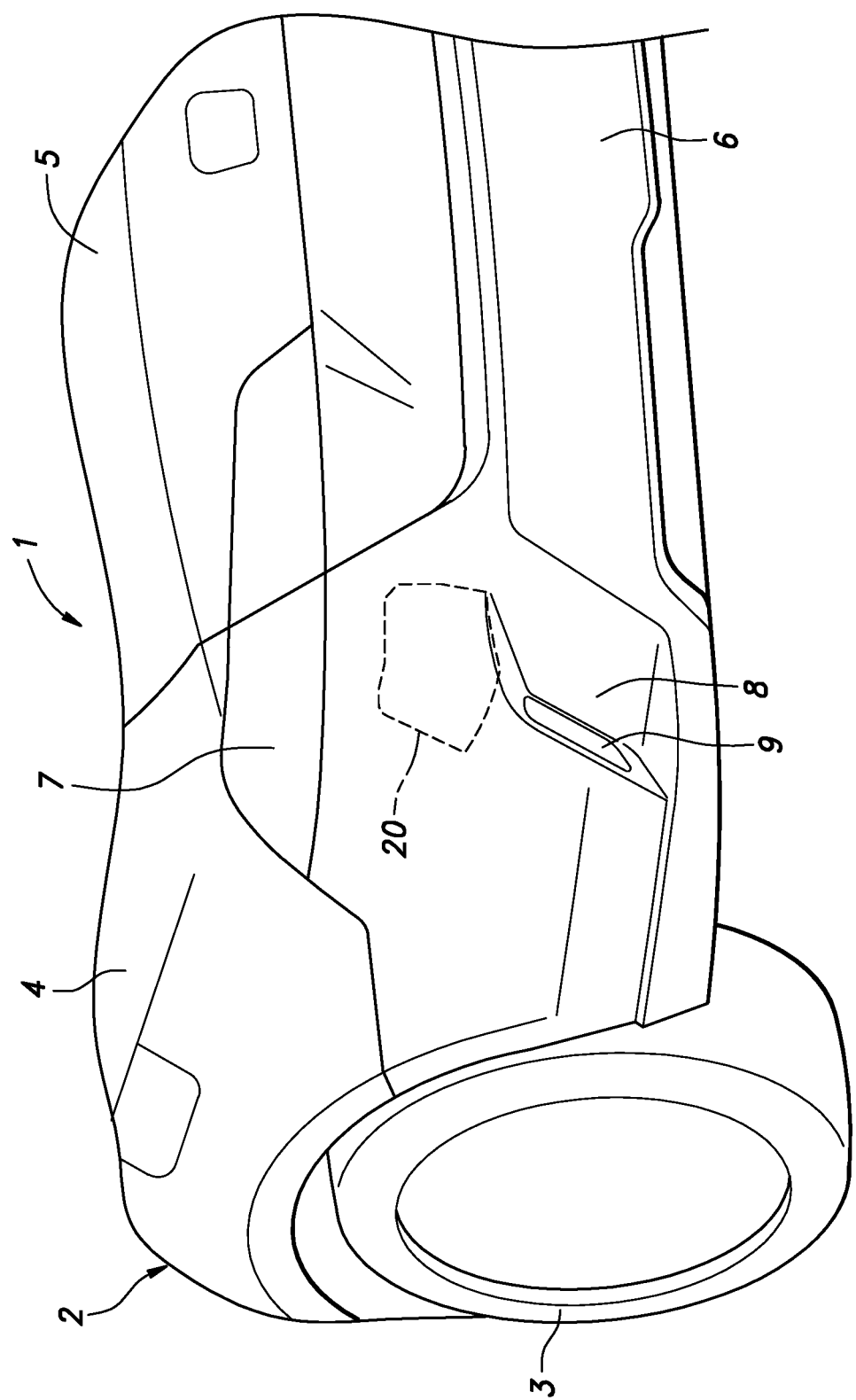
FIG. 1 is a fragmentary perspective view of a vehicle body according to a first embodiment of the present invention as seen obliquely from the rear.

First of all, a radar module 20 according to a first embodiment of the present invention will be described in the following with reference to FIGS. 1 to 5. FIG. 1 is a perspective view of a rear left part of a vehicle according to the first embodiment. As shown in FIG. 1, the vehicle 1 is a four-wheeled vehicle having a vehicle body 2 and four road wheels 3. The rear left part of the vehicle body 2 includes a rear side outer panel 4 forming a tire housing for the rear left wheel 3, a rear trunk lid 5, and a rear bumper face 6.

The rear side outer panel 4, the rear trunk lid 5, and the rear bumper face 6 are panel members defining the rear left exterior of the vehicle body 2. The rear side outer panel 4 and the rear trunk lid 5 are made of stamp formed steel plate, and the rear bumper face 6 is made of an injection molded plastic material.

A rear combination lamp 7 is provided above the left end part of the rear bumper face 6. The rear combination lamp 7 is divided into two parts, one provided integrally with the rear side outer panel 4 and the other with the rear trunk lid 5. The rear left corner of the rear bumper face 6 is provided with a recessed part 8 having a through hole formed therein, and a rearward facing reflector 9 is fitted in the through hole of the recessed part 8.

Figure 2:
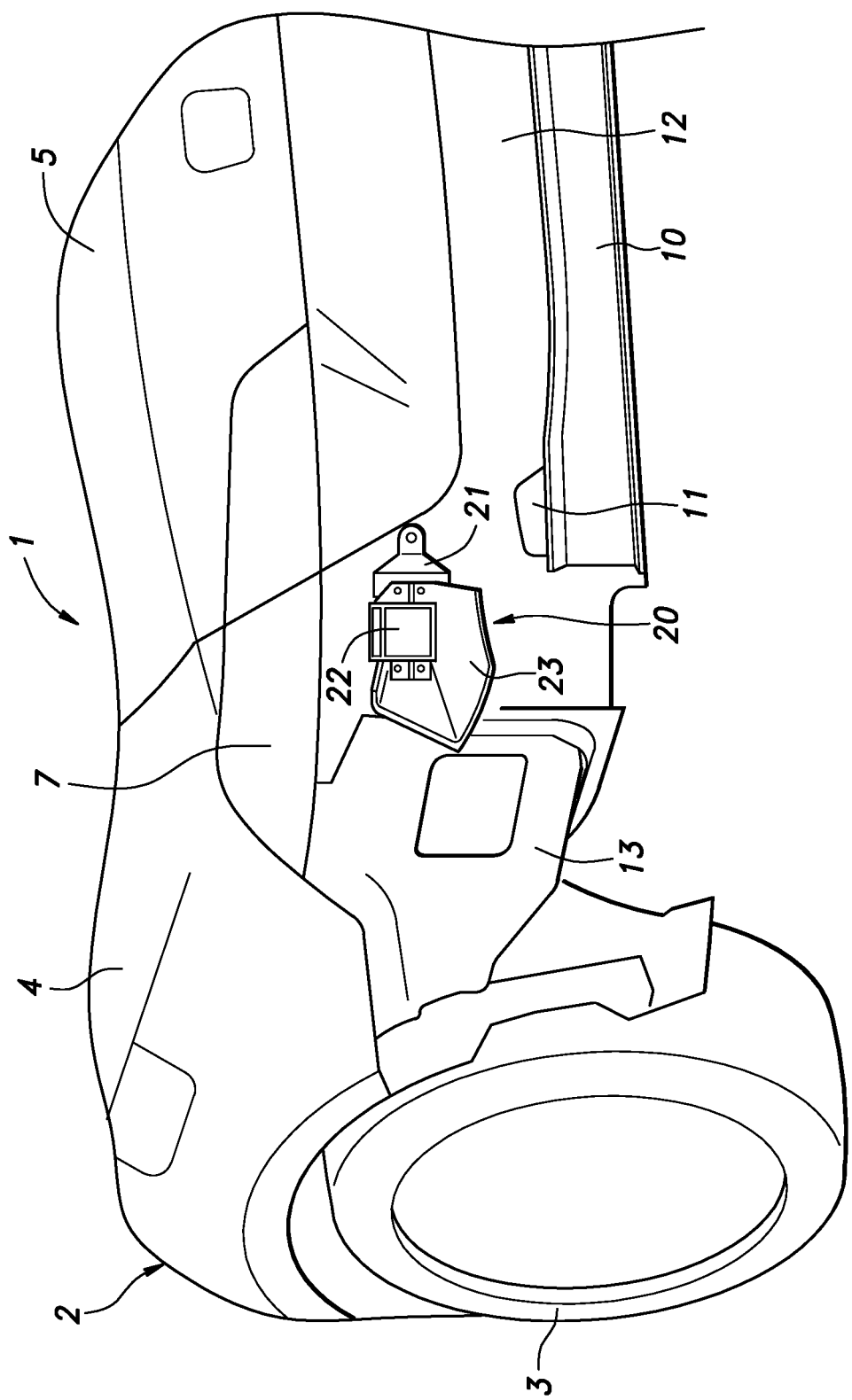
FIG. 2 is a view similar to FIG. 1 with the rear bumper face removed.

FIG. 2 is a perspective view of a rear left part of the vehicle body with the rear bumper face 6 removed. A bumper beam 10 serving as an internal structural member of the vehicle body 2 is provided inward (in front of) the rear bumper face 6. The bumper beam 10 has a substantially rectangular cross-sectional shape and extends in the lateral direction. The left and right ends of the bumper beam 10 are attached to a rear panel 12 via bumper brackets 11 at positions aligning with the rear ends of the left and right rear side frames. The rear panel 12 extends laterally and vertically, and faces forward and backward. A rear end of a rear side inner panel 13 is joined to the left end of the rear panel 12. The rear side inner panel 13 extends in the fore and aft direction and the vertical direction, and faces laterally. The rear side frame, bumper bracket 11, rear panel 12 and rear side inner panel 13 also form internal structural members of the vehicle body 2.

A radar module 20 is positioned inside or inward of the corner part of the rear bumper face 6 (in front of the rear bumper face 6). The radar module 20 is interposed vertically between the rear combination lamp 7 and the reflector 9 (FIG. 1), and positioned laterally outward of the left end of the bumper beam 10. The radar module 20 is attached to the rear panel 12 via a radar bracket 21. The radar module 20 is shown in broken lines in FIG. 1.

The radar module 20 includes a radar device 22 and a cover member 23. The radar device 22 detects an object (target) existing in the direction of a predetermined axis by transmitting (irradiating) an electromagnetic wave over a predetermined angular range centering on this axis, and receiving a reflected wave reflected by the object. The radar device 22 is positioned inside or inward of the rear bumper face 6 with a predetermined gap defined between the rear bumper face 6 and the radar device 22. The angle (attitude) of the radar device 22 can be adjusted by adjusting the radar bracket 21 so that the irradiation axis thereof may be directed in a predetermined direction, and is fixed to the rear panel 12 at that angle.

The radar device 22 is an environment sensor that detects objects existing around the vehicle 1. In another embodiment, a LiDAR (Light Detection and Ranging) device that emits light, a sonar that emits ultrasonic waves, or the like may be provided as an environment sensor instead of the radar device 22.

Since the rear bumper face 6 is made of plastic material, the radar device 22 can detect objects through the rear bumper face 6. Since the radar module 20 is provided inside the rear bumper face 6, a high degree of freedom may be provided for the exterior design of the vehicle 1. As a result, the marketability of the vehicle 1 can be improved.

Figure 3:
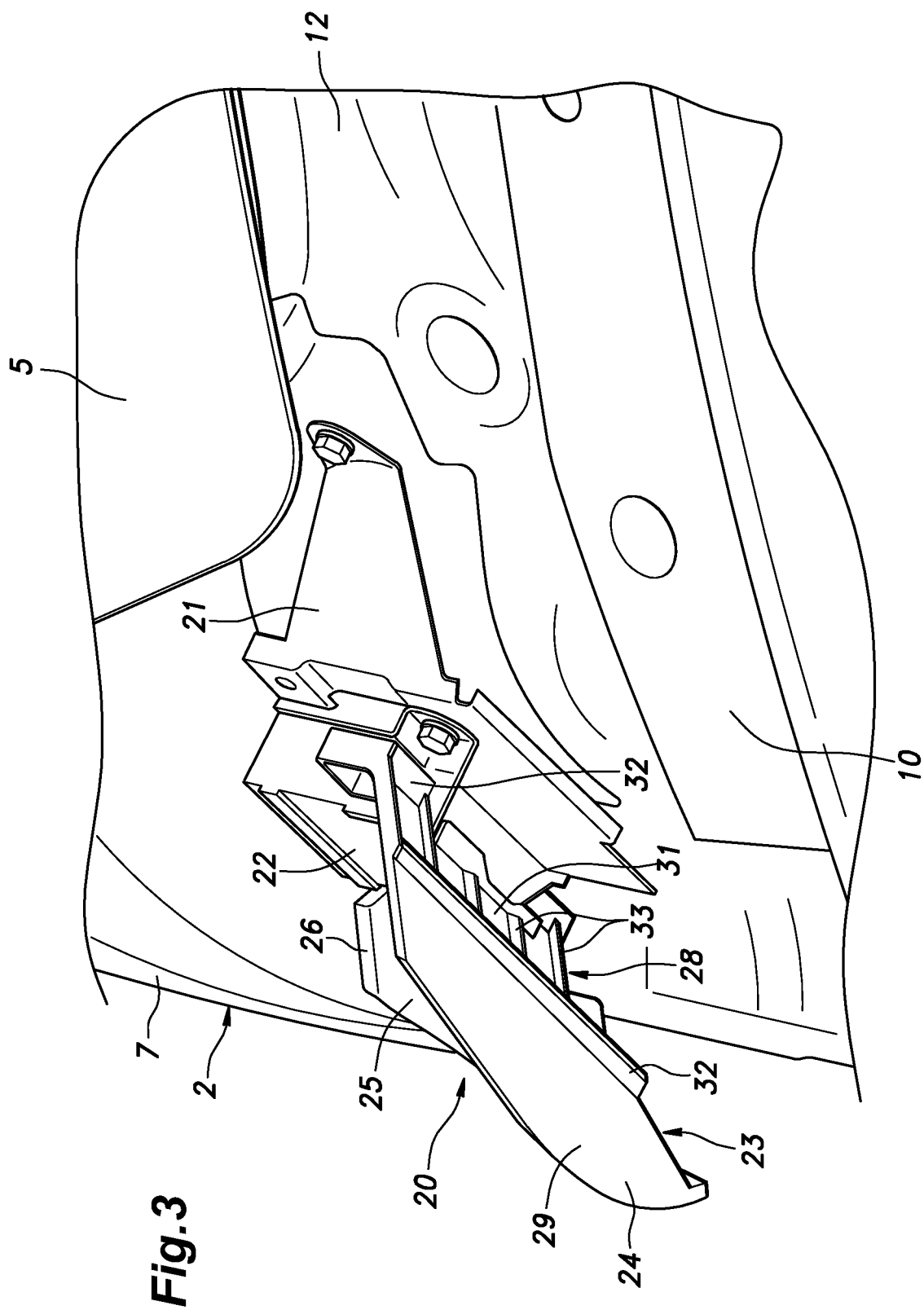
FIG. 3 is a perspective view of a radar module mounted on a rear left corner of the vehicle body.
Figure 4:
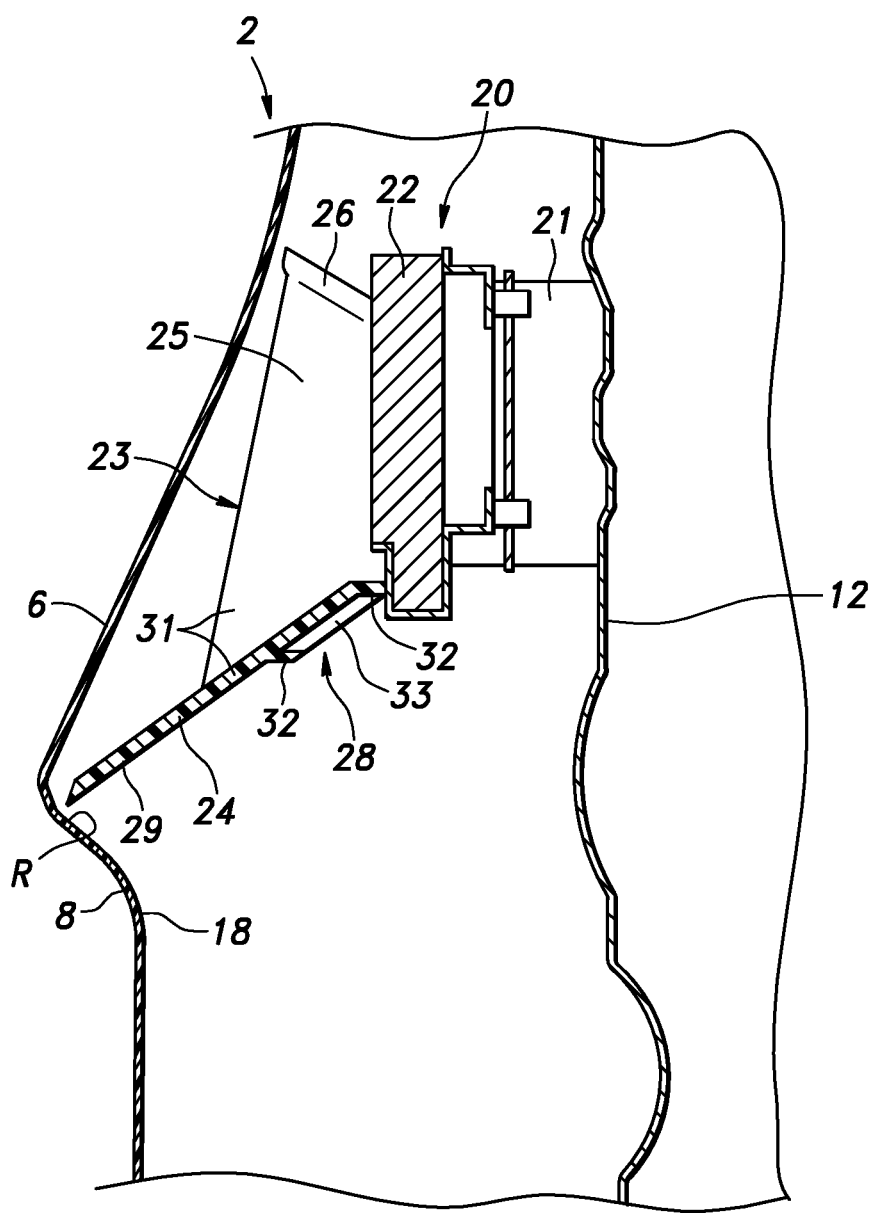
FIG. 4 is a sectional view of the radar module.

FIG. 3 is a perspective view showing the radar module 20 in greater detail, and FIG. 4 is a vertical sectional view of the radar module 20. As shown in FIGS. 2 to 4, the cover member 23 is positioned between the radar device 22 and the rear bumper face 6 (FIG. 1). In particular, the cover member 23 is attached to the radar bracket 21 at the base end thereof, and extends toward the bumper face 6. Alternatively, the cover member 23 may extend from the radar device 22 itself.

The cover member 23 partitions the inner space between the radar device 22 and the rear bumper face 6 from the surrounding or external space, in particular from below. As a result, rainwater, mud, dust, and the like splashed up from the road surface are prevented from depositing on the radar irradiation surface and the radar reception surface of the radar device 22. The cover member 23 has a funnel shape diverging from the base end adjacent to the radar device 22 to the free end adjacent to the bumper face 6. The free end edge of the cover member 23 is irregularly shaped so as to conform to the inner contour of the bumper face 6. A small gap (of a substantially constant dimension) is defined between the tip end edge or free end edge of the cover member 23 and the opposing part of the bumper face 6.

The illustrated radar module 20 is provided at the rear left corner part of the vehicle body 2, and rainwater and mud splashed by the left rear wheel tend to be thrown toward the radar device 22. Therefore, the cover member 23 includes a lower wall 24 positioned below the axis of the radar device 22 and a left wall 25 positioned to the left of the axis, thus having a substantially L-shaped cross section. The upper edge of the left wall 25 is provided with a flange 26 which extends obliquely rightward and upward. The cover member 23 of the radar module 20 provided at the rear right corner part of the rear portion of the vehicle body 2 has a mirror symmetrical shape with respective to the illustrated cover member 23.

The cover member 23 is formed by injection molding thermoplastic material such as polypropylene (PP), polyethylene (PE), polystyrene (PS), vinyl chloride resin (PVC), and polyethylene terephthalate (PET). The cover member 23 can be made of any inexpensive plastic material, and can be fabricated at low cost.

The lower wall 24 of the cover member 23 has a main part 28 provided on the base end part thereof or on the side of the radar bracket 21 or the radar device 22, and a tip end part 29 provided on the free end part thereof or on the side of the rear bumper face 6. The main part 28 and the tip end part 29 each include a part of the lower wall 24 and a part of the left wall 25. The lower wall 24 and the left wall 25 are each attached to radar bracket 21 as a cantilever.

As shown in FIGS. 3 and 4, the lower wall 24 includes a flat plate portion 31 inclined downward toward the rear, and a flange 32 formed on the lower surface of the flat plate portion 31. The flat plate portion 31 slopes downward from a base end thereof adjacent to the radar device 22, and has a progressively increasing lateral width toward a tip end thereof adjacent to the bumper face 6. The flange 32 includes a first part extending laterally (with respect to the extending direction of the lower wall 24) along a base end part thereof, and a second part extending in the lateral direction (parallel to the first part) at some distance from the base end thereof. The term "flange" as used herein shall mean any projection extending along a linear or curvilinear path.

The lower wall 24 is further provided with a plurality of ribs 33 extending in the longitudinal direction (or in the extending direction of the lower wall 24). The base end and the free end of each of the ribs 33 are connected to the first part and the second part of the flange 32, respectively. The term "rib" as used herein shall mean any projection extending along a linear or curvilinear path.

Ribs similar to the ribs 33 are also formed on the surface of the left wall 25 facing left front although not shown in the drawings.

As shown in FIG. 4, the tip end edge (rear edge) of the flat plate portion 31 is immediately adjacent to the inner surface of the rear bumper face 6 to prevent water and other foreign matter from entering the inner space between the radar device 22 and the rear bumper face 6. Alternatively, the rear edge of the flat plate portion 31 may be in contact with the inner surface of the rear bumper face 6. The rear edge of the flat plate portion 31 may be either in a free state or under elastic deformation owing to the contact with the rear bumper face 6. Since the inner space between the radar device 22 and the rear bumper face 6 is partitioned from the surrounding space by the cover member 23 in this manner, deposition of moisture, mud, dirt and other foreign matter are prevented from contaminating the radar device 22.

In this embodiment, the rear edge of the flat plate portion 31 is positioned or received in a recessed part R of the rear bumper face 6. The recessed part R is recessed rearward as compared with the surrounding part of the rear bumper face 6. The rear bumper face 6 has a substantially constant thickness so that the recessed part R is partly defined by a rearward protrusion 18 formed in the rear bumper face 6. Since the rear edge of the flat plate portion 31 is received in the recessed part R of the rear bumper face 6, the flat plate portion 31 is enabled to block the splash which is thrown upward from the road surface in a particularly effective manner.

The flanges 32 and ribs 33 are reinforcing features that reinforce the flat plate portion 31 for increased bending stiffness. Since the flat plate portion 31, the flange 32 and the ribs 33 are made of the same material, the flange 32 and the ribs 33 increase the stiffness, particularly bending stiffness of the flat plate portion 31 owing to their shapes. Since the flange 32 and the ribs 33 are integrally formed with the flat plate portion 31 by injection molding, the reinforcing features can be added to the flat plate portion 31 at a minimum cost.

Figure 5:
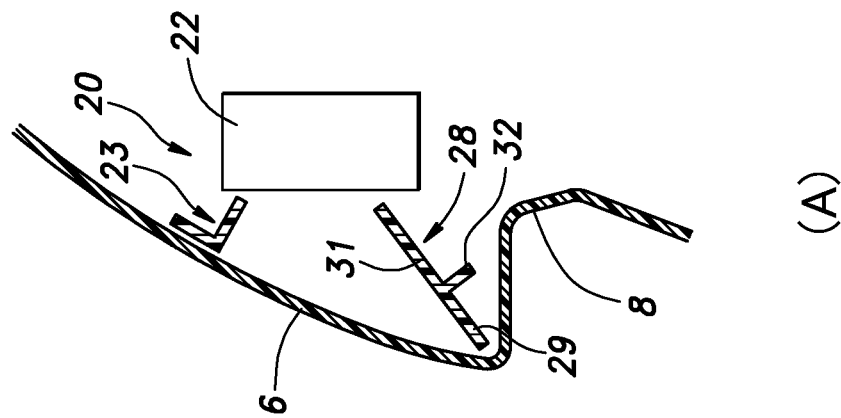
FIG. 5 is a diagram illustrating a mode of deformation of the cover member of the radar module of the first embodiment when the rear bumper face is subjected to an external loading.
Figure 5:
Figure 5:
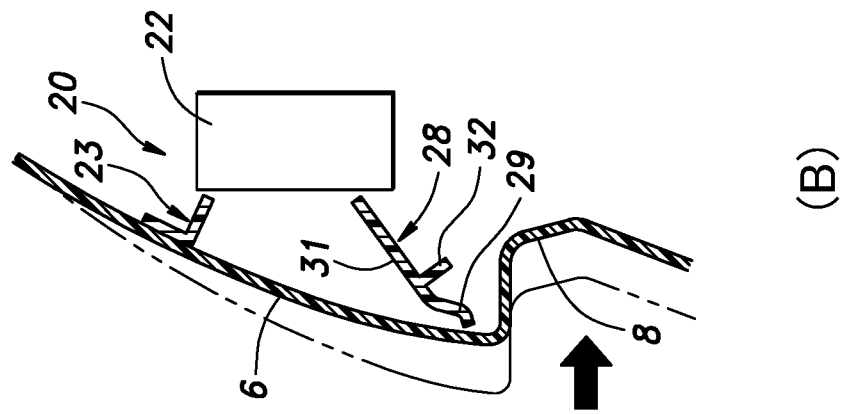

The mode of operation and advantages of the structure described above will be discussed in the following. FIG. 5 is a diagram illustrating the mode of operation of the vehicle body structure according to the first embodiment of the present invention. (A) in FIG. 5 shows the vehicle body structure before experiencing an external impact on the rear bumper face 6, and (B) in FIG. 5 shows the vehicle body structure following an external impact on the rear bumper face 6.

More specifically, (B) in FIG. 5 shows the rear bumper face 6 moving from the initial position indicated by the imaginary line to the position indicated by the solid line due to the loading applied to the rear bumper face 6 such as when the own vehicle is hit by another from the rear. At this time, the inner surface of the rear bumper face 6 contacts the tip of the cover member 23 and moves the tip of the cover member 23 forward. Since the tip end part 29 of the cover member 23 has a low stiffness, and readily deforms, the loading applied to the rear bumper face 6 is not transmitted to the radar device 22 or to the radar bracket 21. As a result, the radar device 22 is prevented from being displaced by the external impact.

As shown in FIG. 3, since the cover member 23 generally diverges toward the rear, or in particular, the lower wall 24 or the flat plate portion 31 is inclined downward toward the rear, when the rear bumper face 6 is pushed forward by the external impact, the lower wall 24 or the flat plate portion 31 readily deflects downward, thereby favorably absorbing the impact transmitted from the rear bumper face 6.

According to this embodiment, the inner surface of the rear bumper face 6 opposes or abuts against the tip end part 29 at an angle to the extending direction of the tip end part 29 (i.e., the normal direction of the rear bumper face 6 opposing the tip end part 29 is at angle to the extending direction of the tip end part 29), the tip end part 29 can favorably bend when an external impact is transmitted from the rear bumper face 6 so that the radar device 22 is effectively protected from the external impact.

In this embodiment, as described above, the main part 28 and the tip end part 29 of the cover member 23 are made of the same material so that the manufacturing of the cover member 23 can be simplified. In particular, by suitably selecting the dimensions and positions of the flange 32 and ribs 33 on the flat plate portion 31, the bending stiffness of the flat plate portion 31 can be freely selected as required.

The flange 32 may be formed entirely or partially along the periphery of the main part 28 for a desired increase in the bending stiffness of the main part 28.

The ribs 33 preferably include parts that extend in the extending direction of the flat plate portion 31, and are connected to the flange 32 for a desired increase in the bending stiffness of the main part 28.

Second Embodiment

Figure 6:
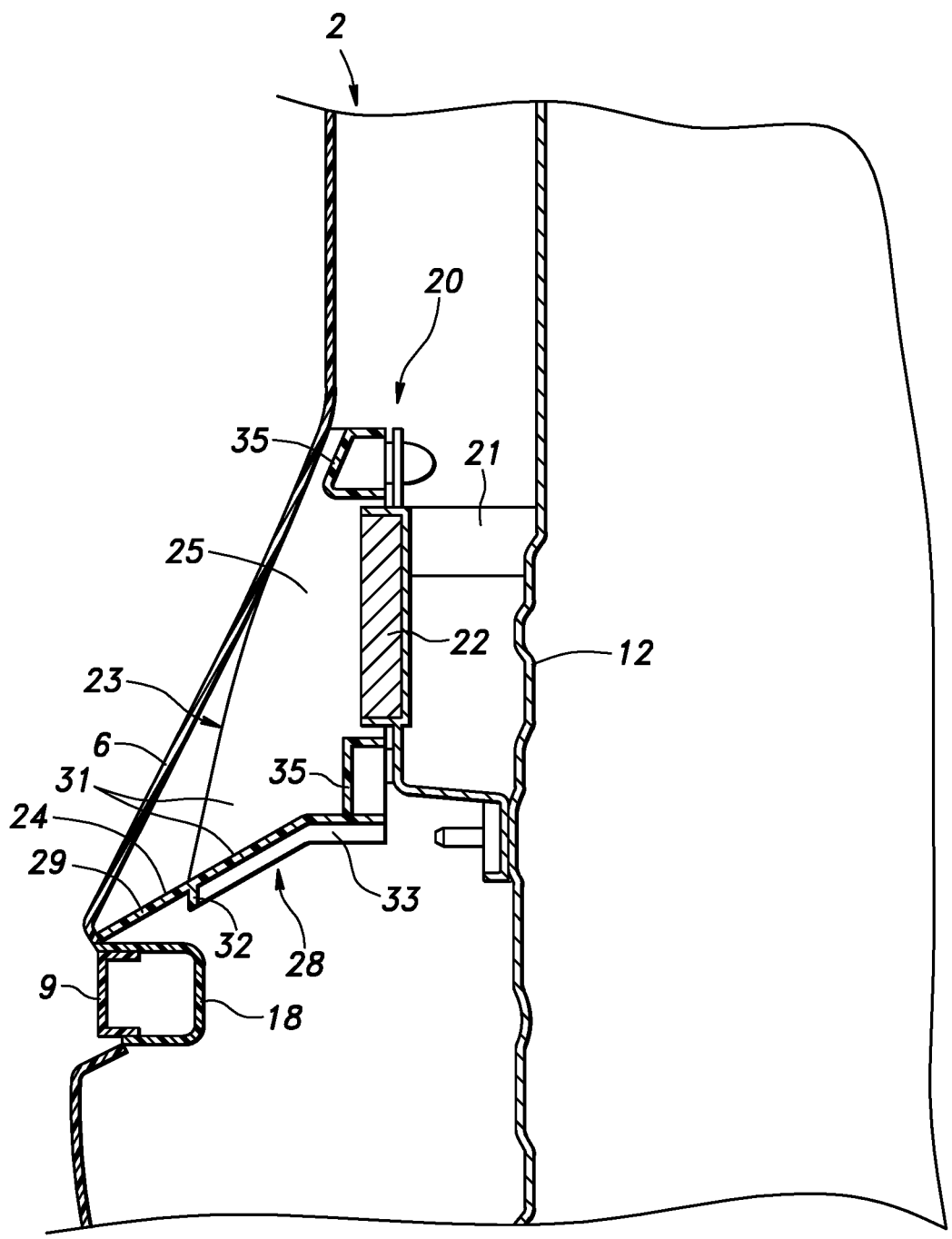
FIG. 6 is a view similar to FIG. 4 showing a radar module according to a second embodiment of the present invention.

Next, a vehicle body structure according to a second embodiment of the present invention will be described in the following with reference to FIG. 6. In FIG. 6, the parts corresponding to those shown in FIG. 4 are denoted with like numerals without necessarily repeating the description of such part to avoid redundancy.

FIG. 6 is a sectional view similar to FIG. 4 showing the vehicle body structure according to the second embodiment of the present invention. As shown in FIG. 6, in this embodiment, the rear bumper face 6 is provided with a reflector 9 in a part of the rear bumper face 6. The rear bumper face 6 is provided with a recessed part which is defined by an inward protrusion of the rear bumper face 6 immediately under the tip end part 29 of the flat plate portion 31, and the reflector 9 which is plate shaped in fitted into this recessed part from outside.

The cover member 23 includes a frame part 35 formed in rectangular shape, closely surrounding the periphery of the radar device 22 and fixedly attached to the radar bracket 21 or the radar device 22 itself. The frame part 35 is made of a channel member having an open side facing forward. The lower wall 24 and the left wall 25 are similar to the counterparts of the first embodiment, but in this embodiment extends from the frame part 35. In this embodiment, the flange 32 is provided only at an intermediate position of the flat plate portion 31 with respect to the longitudinal direction so as to extend laterally (along the boundary between the main part 28 and the tip end part 29), and extend longitudinally along the left and/or right edge of the main part 28.

In this case also, similar advantages to those of the first embodiment can be obtained, and the vehicle body structure operates in a similar manner as that of the first embodiment.

Third Embodiment

Figure 7:
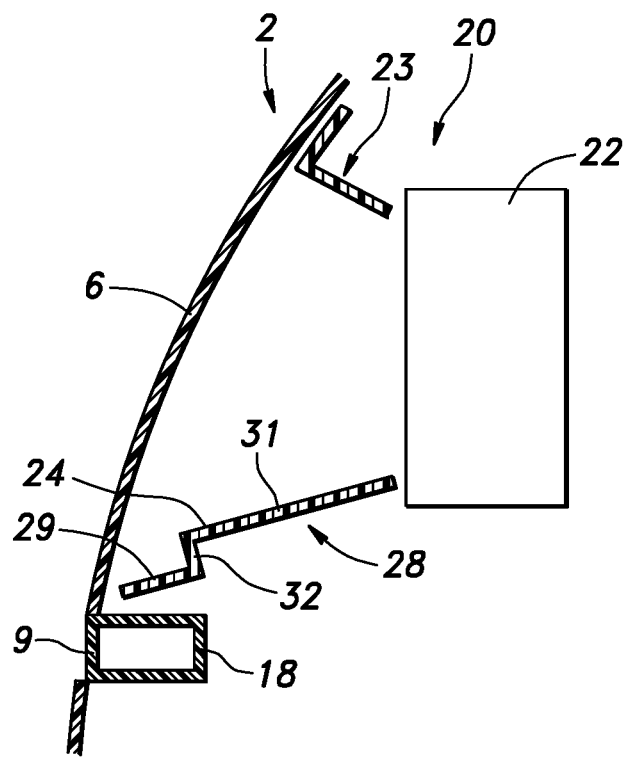
FIG. 7 is a view similar to FIG. 4 showing a radar module according to a third embodiment of the present invention.

Next, a vehicle body structure according to a third embodiment of the present invention will be described in the following with reference to FIG. 7. In FIG. 7, the parts corresponding to those shown in FIG. 4 are denoted with like numerals without necessarily repeating the description of such part to avoid redundancy. As shown in FIG. 7, in this embodiment, a reflector 9 is provided on the rear bumper face 6 as in the second embodiment.

The lower wall 24 of the cover member 23 is provided with a flat plate portion 31 that slopes downward toward the rear, and a flange 32 that extends in the lateral direction at an intermediate region with respect to the longitudinal direction. Ribs 33 similar to those in the first and second embodiments may also be provided in the lower wall 24 of the cover member 23 of the third embodiment.

The flange 32 is located along the boundary between the main part 28 and the tip end part 29 of the flat plate portion 31. More specifically, the flange 32 extends downward from the front edge of the main part 28 of the flat plate portion 31. Further, the tip end part 29 extends rearward from the lower edge of the flange 32. The tip end part 29 is formed purely as a thin plate member having no flange or ribs.

In this case also, the tip end part 29 is readily deformable while the main part 28 is given with a high bending stiffness owing to the presence of the flange 32. If ribs 33 are also provided, it also contributes to the increased bending stiffness of the main part 28.

Fourth Embodiment

Figure 8:
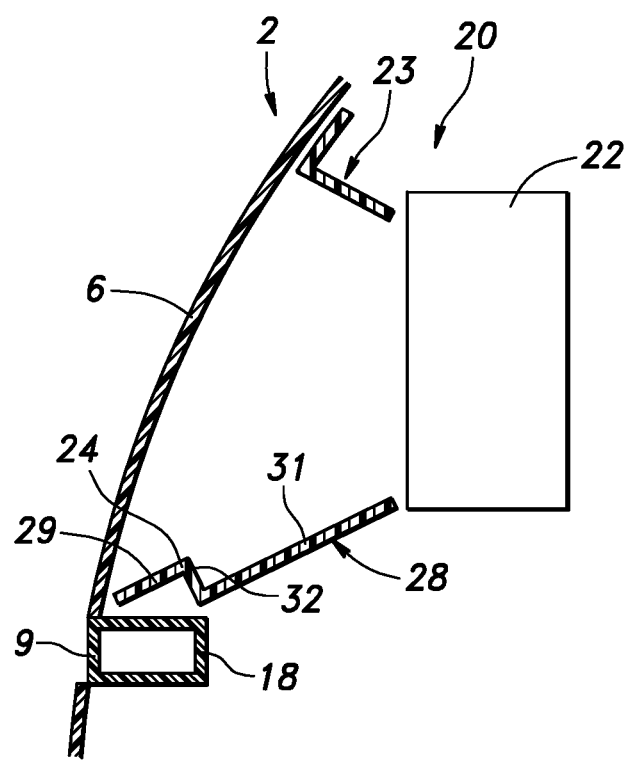
FIG. 8 is a view similar to FIG. 4 showing a radar module according to a fourth embodiment of the present invention.

Next, a vehicle body structure according to a fourth embodiment of the present invention will be described in the following with reference to FIG. 8. In FIG. 8, the parts corresponding to those shown in FIG. 4 are denoted with like numerals without necessarily repeating the description of such part to avoid redundancy. The vehicle body structure of the fourth embodiment is similar to the third embodiment illustrated in FIG. 7, but differs therefrom in that the flange 32 projects upward from the front edge of the flat plate portion 31 of the main part 28 of the lower wall 24, and the tip end part 29 extends from the upper edge of the flange 32.

Thus, the vehicle body structure of the fourth embodiment provides similar advantages as the vehicle body structure of the third embodiment.

Fifth Embodiment

Figure 9:
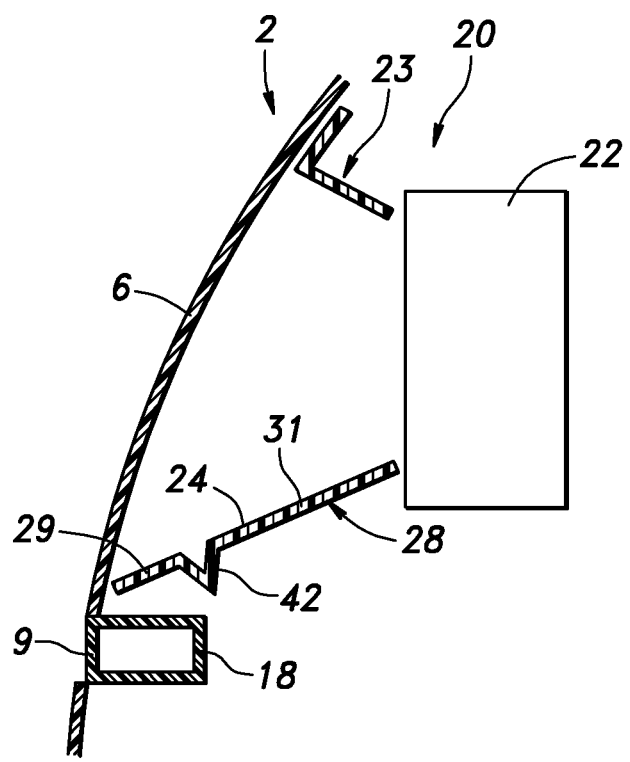
FIG. 9 is a view similar to FIG. 4 showing a radar module according to a fifth embodiment of the present invention.

Next, a vehicle body structure according to a fifth embodiment of the present invention will be described in the following with reference to FIG. 9. In FIG. 9, the parts corresponding to those shown in FIG. 4 are denoted with like numerals without necessarily repeating the description of such part to avoid redundancy. As shown in FIG. 9, in this embodiment, the lower wall 24 of the cover member 23 includes a flat plate portion 31 that slopes downward toward the rear, and a ridge 42 that extends in the lateral direction. The ridge 42 is formed by bending the material of the lower wall 24 so as to protrude downward from the lower surface of the flat plate portion 31. The ridge 42 extends along the boundary between the main part 28 and the tip end part 29 of the flat plate portion 31. The ridge 42 imparts increased stiffness, particularly bending stiffness, to the flat plate portion 31 owing to its geometrical shape. In this embodiment, the plate material forming the ridge 42 has a substantially same thickness as the remaining part of the flat plate portion 31 inclusive of the parts forming the main part 28 and the tip end part 29. The ridge 42 thus defines a groove extending in the lateral direction, and having an open side facing upward. In this embodiment, the cross section of the ridge 42 is V shaped, but may also be U shaped. If desired, the material of the flat plate portion 31 forming the ridge 42 may have an increased thickness as compared to the remaining part of the flat plate portion 31.

This embodiment also provides similar advantages as those of the preceding embodiments. This embodiment is simple in structure so that a particularly cost effective solution may be provided. At the time of impact, the ridge 42 collapses in the longitudinal direction (extending direction) of the flat plate portion while the tip end part 29 bends relative to the main part 28 at the same time so that the cover member 23 is allowed to deform under an impact load in a particularly favorable manner without transmitting the impact load to the radar device 22.

Sixth Embodiment

Figure 10:
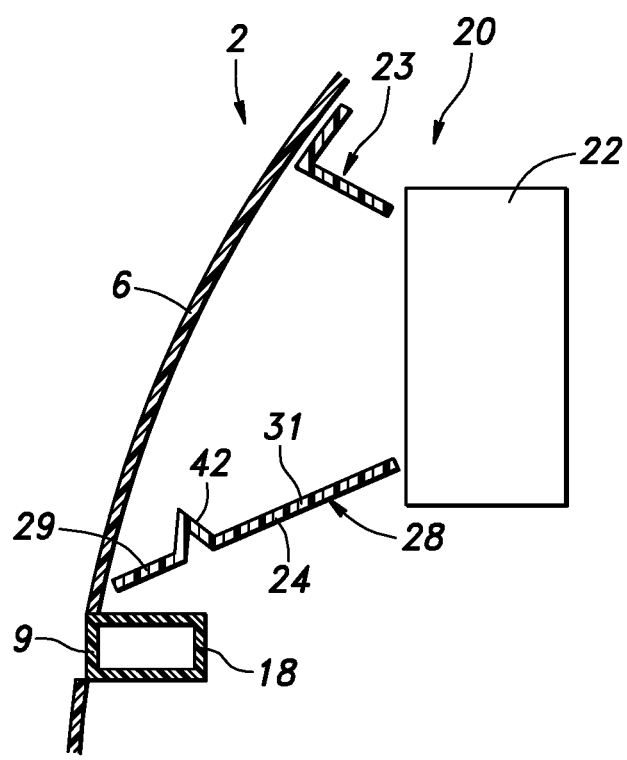
FIG. 10 is a view similar to FIG. 4 showing a radar module according to a sixth embodiment of the present invention.

Next, a vehicle body structure according to a sixth embodiment of the present invention will be described in the following with reference to FIG. 10. In FIG. 10, the parts corresponding to those shown in FIG. 4 are denoted with like numerals without necessarily repeating the description of such part to avoid redundancy. This embodiment is similar to the previous embodiment, but the ridge 42 in this case is inverted as compared to that of the previous embodiment. Thus, the ridge 42 has a pointed end facing upward, and the groove defined by the ridge 42 has an open side facing downward.

The advantages and variations of the preceding embodiments are equally applicable to this embodiment.

Seventh Embodiment

Figure 11:
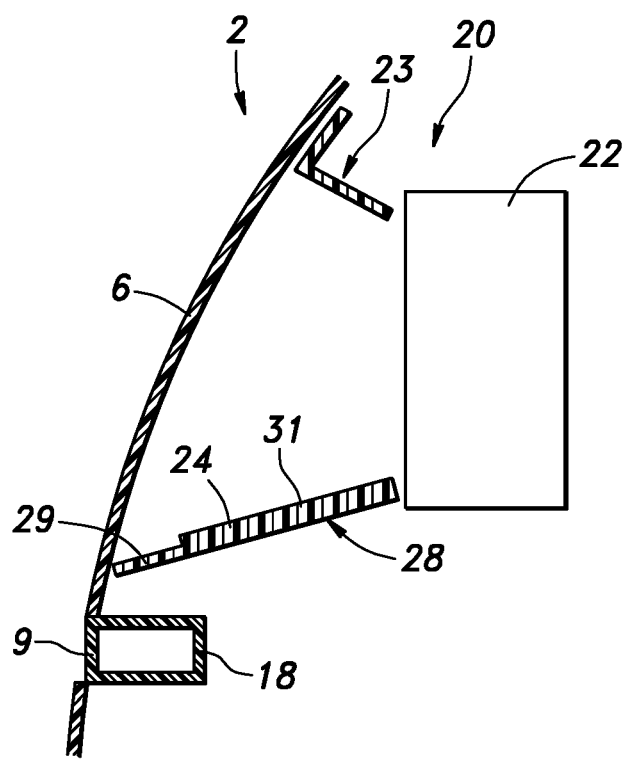
FIG. 11 is a view similar to FIG. 4 showing a radar module according to a seventh embodiment of the present invention.

Next, a vehicle body structure according to a seventh embodiment of the present invention will be described in the following with reference to FIG. 11. In FIG. 11, the parts corresponding to those shown in FIG. 4 are denoted with like numerals without necessarily repeating the description of such part to avoid redundancy. As shown in FIG. 11, in this embodiment, the lower wall 24 of the cover member 23 consists solely of a flat plate portion 31 that slopes downward toward the rear. The flat plate portion 31 includes a main part 28 (base end part) extending rearward from the radar device 22 to a point some distance short of the opposing surface of the rear bumper face 6 and having a first thickness, and a tip end part 29 extending rearward from the main part 28 to a point adjacent to the opposing surface of the rear bumper face 6 and a having a second thickness which is substantially smaller than the first thickness. The lower wall 24 of the cover member 23 is uniformly made of a same plastic material. Therefore, the tip end part 29 has a substantially lower bending stiffness than the main part 28.

In this case also, the impact load applied to the rear bumper face 6 is effectively prevented from being transmitted to the radar device 22 while the cover member 23 maintains the function thereof to protect the radar device 22 from external contamination. The stiffness of the main part 28 and the stiffness of the tip end part 29 can be freely differentiated by the selecting different levels of stiffness to these parts.

Eighth Embodiment

Figure 12:
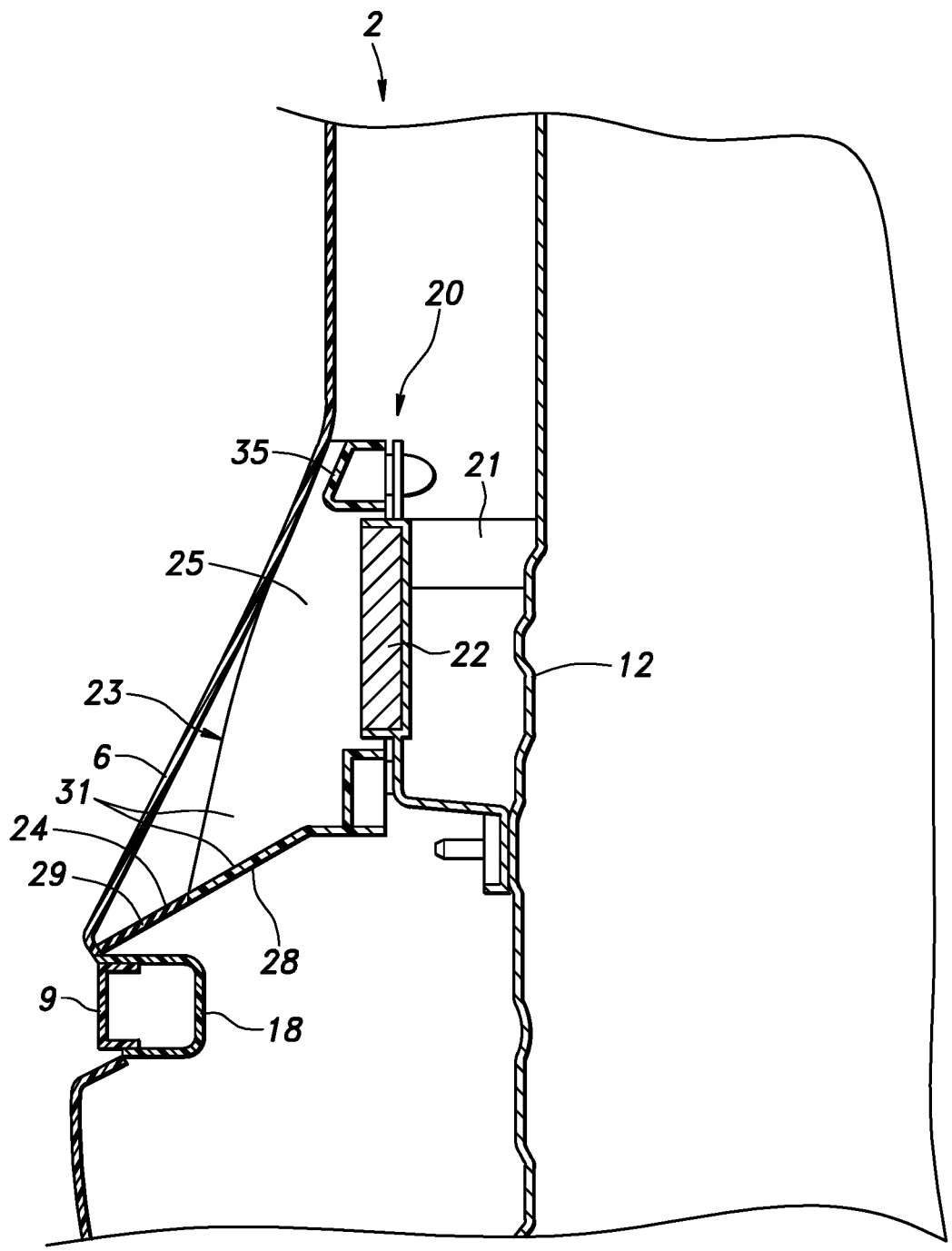
FIG. 12 is a view similar to FIG. 4 showing a radar module according to an eighth embodiment of the present invention.

Next, a vehicle body structure according to an eighth embodiment of the present invention will be described in the following with reference to FIG. 12. In FIG. 12, the parts corresponding to those shown in FIG. 4 are denoted with like numerals without necessarily repeating the description of such part to avoid redundancy. As shown in FIG. 12, in this embodiment, the lower wall 24 of the cover member 23 solely consists of a flat plate portion 31 that slopes downward toward the rear, without having a flange 32 (as that shown in FIG. 6) and ribs 33 (as those shown in FIG. 6) or any reinforcing features.

The flat plate portion 31 of the cover member 23 includes a main part 28 made of a first plastic material and a tip end part 29 made of a second plastic material which has a lower stiffness or a lower modulus of elasticity than the first plastic material. The second material may consist of an elastomeric material which is both elastic and flexible. In this case also, the relatively stiff main part 28 ensures the protective function which is required of the cover member 23, and the relatively flexible tip end part ensures the external impact applied to the rear bumper face 6 from being transmitted to the radar device 22.

The main part 28 and the tip end part 29 of the cover member 23 may be formed by joined together two separated molded pieces by welding, adhesion or shape engagement, but more preferably by overmolding.

Figure 13:
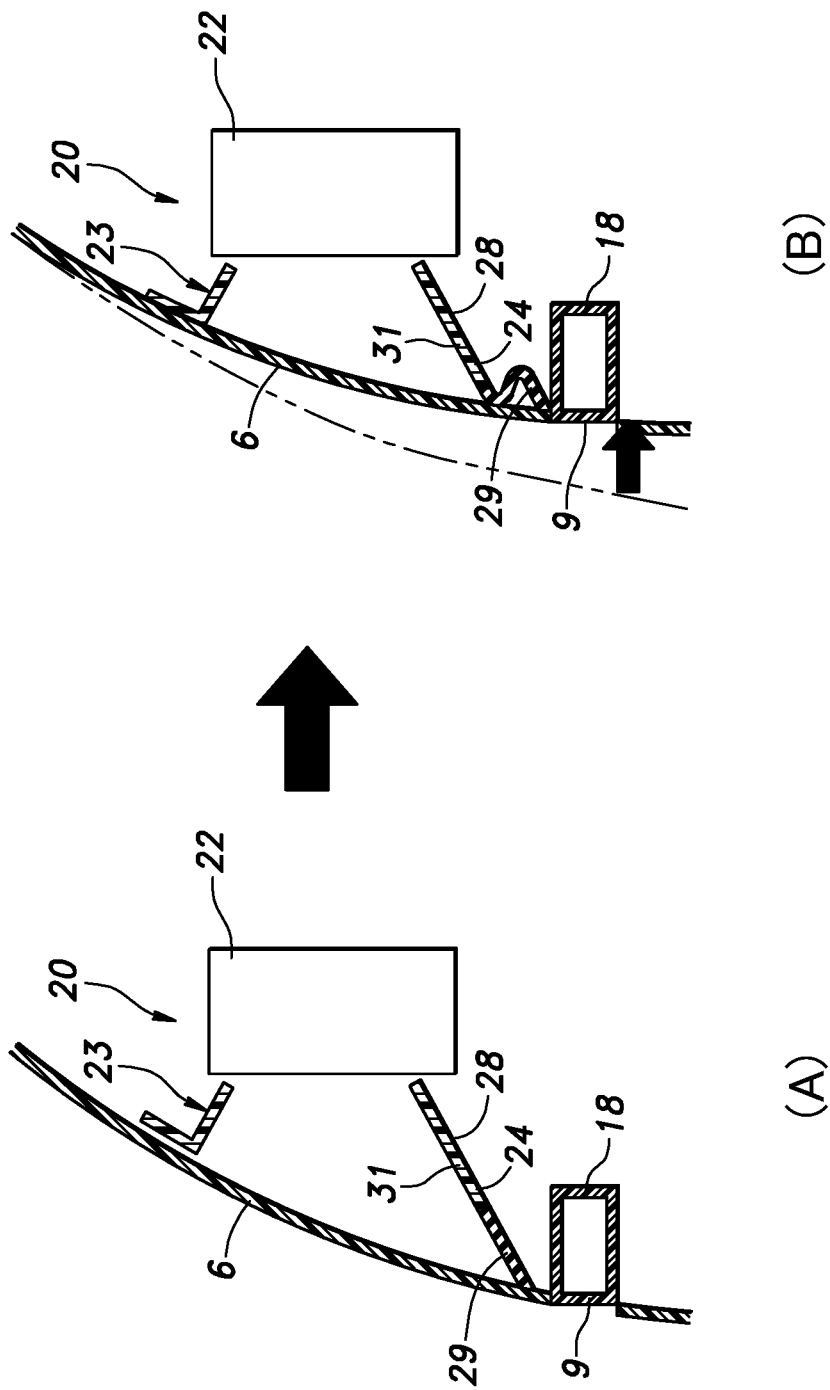
FIG. 13 is a diagram illustrating a mode of deformation of the cover member of the radar module of the eight embodiment when the rear bumper face is subjected to an external loading.

FIG. 13 shows the mode of operation of the rear vehicle body structure shown in FIG. 12 when a rearward load is applied to the rear bumper face 6. When an impact load is applied to the rear end of the vehicle 1, the bumper face 6 deforms from the original state shown in (A) of FIG. 13 to (B) of FIG. 13, and deflects inward or forward as shown by the imaginary line.

The inner surface of the rear bumper face 6 contacts the tip of the cover member 23 and pushes the tip of the cover member 23 forward. Since the tip end part 29 of the cover member 23 is substantially more readily deformable than the main part 28 thereof, the tip end part 29 of the cover member 23 undergoes a bending and/or buckling deformation while the main part 28 remains undeformed so that the radar device 22 is protected from an external impact while the radar device 22 is effectively protected from external contamination before, during and after this incidence.

Since the tip end part 29 is made of a different material from the main part 28, the stiffnesses of the tip end part 29 and the main part 28 can be optimized with ease. In the foregoing embodiments, the left wall 25 (a side wall) may be considered as a reinforcing feature when the left wall has a lower edge connected to a corresponding side edge of the lower wall 24, and the lower edge of the side wall extends from the base end of the lower wall 24 to a point some distance short of the tip end of the lower wall 24 (although not shown in the drawings). Preferably, the lower wall 24 slopes downward from a base end thereof adjacent to the radar device 22 and has a progressively increasing lateral width toward a tip end thereof adjacent to the rear bumper face 6. Thus, the side wall contributes to the reinforcement of the main part of the lower wall while the tip end part is allowed to bend or otherwise deform relatively readily and is prevented from interfering with an irradiation range of the environment sensor at the same time.

The present invention has been described in terms of specific embodiment, but the present invention is not limited by such embodiments and can be modified in various ways without departing from the scope of the present invention. This completes the description of the specific embodiments, but the present invention is not limited to the above embodiments and modifications, and can be widely modified. Moreover, not all of the constituent elements shown in the above embodiments are essential to the broad concept of the present invention, and they can be appropriately selected, omitted and substituted without departing from the gist of the present invention. The contents of any cited references in this disclosure will be incorporated in the present application by reference.

The invention claimed is:

1. A vehicle body structure fitted with an environment sensor, comprising:
   a bumper face provided on an exterior of a vehicle body;
   an internal structural member positioned inward of the bumper face so as to define an inner space between the bumper face and the internal structural member;
   an environment sensor positioned in the inner space and attached to the internal structural member; and
   a cover member including a lower wall extending from the internal structural member to a point adjacent to the bumper face to substantially close the inner space from below,
   the cover member including a main part forming a base end part thereof and a tip end part extending from the main part to the point adjacent to the bumper face and having a substantially lower stiffness than the main part,
   wherein the main part and the tip end part are made of a plate member made of a same material, and the main part is given with an increased bending stiffness by a reinforcing feature formed therein as compared with the tip end part,
   wherein the reinforcing feature includes a flange extending laterally on the main part, and
   wherein the flange includes a first part extending laterally along a base end part of the lower wall, and a second part extending laterally at some distance from the base end of the lower wall.

2. The vehicle body structure according to claim 1, wherein the reinforcing feature includes a rib provided in the main part and extending in a longitudinal direction.

3. The vehicle body structure according to claim 1, wherein the reinforcing feature includes a ridge extending laterally on the lower wall.

4. The vehicle body structure according to claim 1, wherein the main part and the tip end part are made of a plate member of a same material, and the tip end part has a smaller thickness than the main part.

5. The vehicle body structure according to claim 1, wherein the main part is made of a first material, and the tip end part is made of a second material having a substantially lower modulus of elasticity than the first material.

6. The vehicle body structure according to claim 1, wherein the bumper face is provided with a recessed part which receives a tip end edge of the tip end part of the lower wall.

* * * * *